United States Patent [19]  [11] Patent Number: 4,959,336
Job  [45] Date of Patent: *Sep. 25, 1990

[54] SILICATE-MODIFIED MAGNESIUM ETHOXIDE POLYMERIZATION CATALYSTS

[75] Inventor: Robert C. Job, Houston, Tex.

[73] Assignee: Shell Oil Company, Houston, Tex.

[*] Notice: The portion of the term of this patent subsequent to Oct. 17, 2006 has been disclaimed.

[21] Appl. No.: 334,407

[22] Filed: Apr. 7, 1989

[51] Int. Cl.$^5$ .................. B01J 31/14; C08F 4/654
[52] U.S. Cl. ..................... 502/107; 502/104; 502/111; 502/125; 502/171
[58] Field of Search ............... 502/104, 107, 111, 171

[56] References Cited

U.S. PATENT DOCUMENTS

| | | | |
|---|---|---|---|
| 4,400,302 | 8/1983 | Goodall et al. | 252/429 |
| 4,414,132 | 11/1983 | Goodall et al. | 502/169 |
| 4,511,669 | 4/1985 | Gessell | 502/110 |
| 4,552,858 | 11/1985 | Imai et al. | 502/112 |
| 4,590,247 | 5/1986 | Morguet et al. | 526/124 |
| 4,654,318 | 3/1987 | Yamamoto et al. | 502/119 |
| 4,710,482 | 12/1987 | Job | 502/127 |
| 4,780,441 | 10/1988 | Graroff | 502/107 |
| 4,874,737 | 10/1989 | Job | 502/171 |
| 4,876,230 | 10/1989 | Job | 502/171 |

Primary Examiner—Patrick P. Garvin

[57] ABSTRACT

A process is disclosed for improving the productivity of a polymerization catalyst formed from a magnesium ethoxide. The process comprises treating the magnesium ethoxide with a silane alkoxide at or above the temperature at which any alcohol which may be bound to the ethoxide dissociates from the alkoxide prior to subjecting the magnesium ethoxide to metathesis.

6 Claims, No Drawings

SILICATE-MODIFIED MAGNESIUM ETHOXIDE POLYMERIZATION CATALYSTS

BACKGROUND OF THE INVENTION

This invention relates to the production of olefin polymers by polymerization with a magnesium ethoxide polymerization catalyst. More particularly, the present invention relates to the improvement of the productivity of polymerization catalysts formed from magnesium ethoxides.

Experience has shown that the best magnesium chloride supported titanium tetrahalide catalysts for olefin polymerization are prepared via metathesis of a suitable magnesium compound rather than forceful mechanical and chemical treatment of magnesium chloride. Very good commercial polymerization catalysts have been prepared via metathesis of magnesium ethoxide using titanium tetrachloride in the presence of an ester and, optionally, a halohydrocarbon as disclosed in U.S. Pat. Nos. 4,400,302 and 4,414,132.

It is an object of the present invention to increase the productivity of catalysts made from magnesium ethoxide and also to improve the morphology of catalysts and polymers made therewith.

SUMMARY OF THE INVENTION

The present invention is a process for improving the productivity of a polymerization catalyst formed from a magnesium ethoxide. The process comprises treating the magnesium ethoxide at elevated temperature with a silane of the formula $R_m'Si(OR)_{4-m}$ (where $R=C_nH_{2n+1}$, $n \geq 2$, $0 \leq m < 4$ and R' may be an aryl or alkyl) prior to subjecting the magnesium ethoxide to metathesis to form the procatalyst for the polymerization catalyst. For example, the silane may be selected from the group consisting of silicon tetraethoxide, silicon tetraisopropoxide, silicon tetrabutoxide and silicon tetrapropoxide. The temperature should be at or above the temperature at which any bound alcohol dissociates from the ethoxide.

DETAILED DESCRIPTION OF THE INVENTION

In the presence of titanium tetrachloride and a suitable electron donor magnesium ethoxide undergoes metathesis to magnesium chloride relatively easily. The polymerization productivity of such a catalyst and especially the polymer morphology which is achievable by using such a catalyst can be improved by first treating the magnesium ethoxide at elevated temperature with a silane which is selected from the group consisting of $R_m'Si(OR)_{4-m}$ where R is $C_nH_{2n+1}$, $0 \leq m < 4$, $n \geq 2$ and R' is an aryl or alkyl group. The preferred silane is silicon tetraethoxide because of ready and inexpensive commercial availability.

If an alcohol is bound to the original magnesium ethoxide, a portion of that will be converted to the alcohol of the silicon alkoxide. Some of this alcohol may bind to the newly formed magnesium ethoxide. Accordingly, the alkoxysilane treatment is carried out at a temperature above that necessary to dissociate that bound alcohol. Thus, if the alkoxysilane is silicon tetraethoxide, the alcohol formed is ethanol and it will dissociate from the magnesium ethoxide at or above about 105° C. in the absence of a solvent or in the presence of a higher boiling point solvent. If the bound alcohol is not removed, catalysts of markedly lower productivity may be obtained. In general, this treatment is carried out at a temperature significantly above the alcohol dissociation point for the additional reason that the changes which result in increased catalyst reactivity and improved morphology will occur much more rapidly at higher temperature. In some cases, in order to moderate the reactivity and to help maintain desirable precursor morphology, it might be appropriate to dilute the alkoxysilane with an unreactive solvent. In those cases the solvent chosen should boil at no lower than the above-mentioned alcohol dissociation point, i.e. about 105° C. for ethanol.

The only exception to this temperature requirement is a preferred embodiment. Lower boiling solvents such as cyclohexane and kerosene can be used if they form a lower boiling azeotrope with the alcohol. The removal of the alcohol should be carried out as completely as possible in order to reduce the amount of oligomerization of the magnesium alkoxide (which appears to be catalyzed by alcohol). Other suitable solvents include chlorobenzene, isooctane, decahydronaphthalene, tetrahydronaphthalene, xylene, toluene and high boiling kerosene fractions.

MAGNESIUM ETHOXIDE PREPARATION

EXAMPLE 1

(Comparative example without boiling in a silane.)

Magnesium powder (50 mesh, 10 g, 0.41 mol) was slurried in 50 g of tetraethoxy silane (TEOS) then 100 g of ethanol was added. Ferric chloride dissolved in ethanol (1.9 mmol) was added, then the mixture was slurried once more then allowed to stand at room temperature. After standing overnight the voluminous granular precipitate was washed, on a fritted glass funnel, with three portions of isooctane and dried under moving nitrogen to yield a granular grey solid of about 200 micron average particle size.

EXAMPLE 2

Magnesium ethoxide (15 g) was slurried, in an 8 oz. bottle, with 100 g of ethanol in which 1.8 g of titanium isopropoxide had been dissolved. The bottle was sealed and the mixture stirred in an oil bath at 110° to 117° C. After 4 hours the mixture was cooled and filtered then the solids washed three times with isooctane and dried under moving nitrogen. Yield 12.3 g (82% of theory). Mg=18.6%. Microscopic examination revealed the product to be translucent rounded granules of about 7 to 25 microns with a mode (the estimated size of the majority of the particles) about 15 micron but with a number of large agglomerations of small particles.

EXAMPLE 3

Magnesium powder (50 mesh, 10.1 g, 0.42 mol) was slurried with 25 g of toluene, in an 8 oz. bottle, then 72 g of ethanol was added and the mixture slurried again. Bromine (0.3 g, 3.8 mmol) and an ethanol solution of ferric chloride (1.9 mmol) were added. After 20 minutes the reaction had become so violent so as to nearly boil over. After 1.5 hours the mixture had become a solid granulated mass. Ethanol (68 g) was added to obtain a thick grey mud. After standing two days titanium isopropoxide (5 g) was added and enough toluene to bring the total volume to about 400 ml (in a 16 oz. bottle). The mixture was boiled at 105° C., with rapid stirring then filtered and the solids washed with isooctane and dried under moving nitrogen to give a fine grey-white powder. Yield 47.8 g (100% of theory).

EXAMPLE 4

Magnesium powder (50 mesh, 70 g, 2.88 mol) was added to a 1 gal autoclave equipped with a shaft of three 5-blade stirrers and a 4 slat baffle. To this was added 175 g of toluene and the contents stirred gently for 3 minutes. Anhydrous ethanol (735 g, 16 mol), 2.1 g of bromine (26 mmol) and 22 mmol of ferric chloride dissolved in ethanol were added and slow stirring begun. After 4 minutes titanium isopropoxide (14 g, 49 mmol) was added. Stirring was then stopped and the autoclave was vented and allowed to stand without heating or cooling. After 3.5 hours another 1500 g of ethanol and 91 g of titanium isopropoxide (0.26 mol) were added and the stirrer set at 250–300 rpm. After 0.5 hours at room temperature the vent was closed and the temperature raised to 120° C. and stirring continued for 3 hours. The autoclave was vented as necessary (to relieve evolved hydrogen) whenever the pressure exceeded 400 psi. After cooling to room temperature, the slurry was filtered on a coarse fritted funnel, washed once with ethanol and three times with isooctane and dried under moving nitrogen.

One eighth of the solids were slurried in 232 g of tetraethoxysilane (TEOS) and heating commenced with stirring at medium speed. At a slurry temperature of about 115° C., foaming was evident (evolution of bound ethanol). By 126° C. the foaming was very vigorous. Heating was continued at a rate to increase the temperature by about 1.5 degrees per minute until the slurry reached 167° C. at which time the slurry was allowed to cool (at about 2 degrees per minute). The slurry was filtered at 50° C., then the solid washed three times with isooctane and dried under moving nitrogen. Yield 31.2 g (80% of theory). Mg=20.8%. Microscopic examination revealed the translucent white product to be composed of a broad distribution of particles in the range of between 2 to 50 micron.

EXAMPLE 5

Magnesium powder (50 mesh, 10 g, 0.41 mol) was slurried in a mixture of 25 g TEOS and 66 g of ethanol (1.4 mol). Bromine (0.3g, 3.8 mmol) and 1.7 mmol of ferric chloride in ethanol were added and the mixture slurried again. Finally titanium isopropoxide (2.2 g, 10 mmol) was added and the mixture allowed to stand overnight at room temperature. More TEOS (263 g) was added and heating was commenced (with rapid stirring) at a rate to raise the temperature by about 2 degrees per minute until 94° C. where the rate was slowed to about 0.33 degrees per minute in the range of vigorous ebulliation between 94° and 106° C. The slurry was then rapidly heated to 166° C. and held there for 10 minutes before the mixture was allowed to cool. Filtration was carried out at 50° C. The solids were washed three times with isooctane then dried under moving nitrogen. Yield 44 g (93.5% of theory). Mg=22.4%. Microscopic examination revealed the translucent white product to be composed largely of regular shaped particles in the 7 to 35 micron range with a number of much larger particles and an observable amount of fine powder material.

EXAMPLE 6

Magnesium powder (50 mesh, 10 g, 0.41 mol) was slurried in 25 g of toluene then 105 g of ethanol and 0.3 g bromine (3.8 mol) was added (no bubbles were observed) followed by 1.7 mmol of ferric chloride in ethanol (large numbers of bubbles were observed) followed 3 minutes later by 2.0 g of titanium isopropoxide whereupon vigorous effervescence was observed as the reaction mixture heated noticeably. After standing overnight at room temperature, a further 40 g of ethanol was added in order to be able to stir the thick slush. The solids were allowed to settle and the cloudy supernatant discarded. The remaining solids were washed twice with ethanol and the cloudy supernatants discarded. Ethanol (430 g) and titanium isopropoxide (15 g) were added and the mixture stirred for 2 hours, in a 120° C. oil bath, with the vessel sealed. After allowing to cool to room temperature (with continued stirring) the mixture was filtered, then the solids were washed three times with isooctane and dried under moving nitrogen. Yield 28.5 g (61% of theory). Mg=21.0%. Microscopic examination revealed the translucent white solid to be composed of particles which were mostly in the 7 to 35 micron range with only a few much larger particles (or agglomerates of small particles).

EXAMPLE 7

Magnesium powder (50 mesh, 10 g, 0.41 mol) was slurried in 25 g of toluene and 126 g of ethanol in a 16 oz. bottle. Bromine (0.3 g, 3.8 mmol) and ferric chloride (1.7 mmol) in ethanol were added. After about 15 minutes, effervescence had gotten vigorous and stirring was started. After 27 minutes total time the slurry temperature had risen to 71° C. with vigorous hydrogen evolution. After 1.5 hours the stirring slurry was placed on a 76° C. hotplate. By 3.5 hours total time the slurry was all beaten up to a grey mud. TEOS (190 g) was added and the rapidly stirring slurry was placed in an oil bath which was heated to 120° C. and held there until the rapid evolution of ethanol had nearly ceased. The oil bath was allowed to heat to about 180° C. Ebulliation was noticed near 115° C. pot temperature and again at about 155° C. When the pot temperature had reached 164° C., heating was stopped and the stirring slurry allowed to cool. The slurry was filtered and the solids washed three times with isooctane and dried under moving nitrogen. Yield 46.8 g (99.7% of theory). Mg=21.7%. Microscopic examination revealed a broad particle size distribution centered roughly about 15 micron.

EXAMPLE 8

Magnesium powder (50 mesh, 10.1 g, 0.42 mol) was slurried in 101 g ethanol then 0.5 g toluene and 19 g of a 35% ethanolic solution of magnesium ethyl carbonate was added. Since there was almost imperceptible hydrogen evolution 2.0 mmol of ethanolic ferric chloride was added. After 10 minutes there was rapid gas evolution. Overnight standing yielded a voluminous granular precipitate. TEOS (222 g) was added in a 1 pint bottle and the mixture heated on an oil bath with vigorous stirring. Product (probably ethanol) began to distill off at 82° C. The heating was continued until the slurry temperature had reached 164° C. After cooling the supernatant (containing fine material) was siphoned away as was the cloudy supernatant from two successive isooctane rinses then the resulting slurry was filtered and the solids washed three times with isooctane and dried under moving nitrogen. Yield 33.3 g (70% of theory). Mg=21.3%. Microscopic examination revealed the product to be a layered opaque material with roughly the same coarse shape as the starting magnesium metal.

EXAMPLE 9

Magnesium powder (50 mesh, 6.1 g, 0.25 mol) was slurried in 52 g of toluene and 89 g ethanol then 0.3 g of bromine (3.8 mmol) and 1.7 mmol ferric chloride in ethanol were added. After 1 hour the mixture was heated to initiate reaction. With no further heating the mixture effervesced strongly and the temperature had risen from 53° C. up to 72° C. over the next 0.5 hour. After 3 hours 233 g TEOS was added and the rapidly stirring mixture was held at a 123° C. oil bath temperature until the particles had broken up to a fine grey slurry. The oil bath temperature was then allowed to rise as the pot temperature rose through a region of apparently sticky product at about 145° C. then to 165° C. where heating was stopped and the stirring mixture capped and the slurry allowed to cool. The mixture was filtered and the solids washed three times with isooctane then dried under moving nitrogen. Yield 28.0 g (97.6% of theory). Microscopic examination revealed transparent particles in the 10 to 30 micron range with the mode about 14 micron.

EXAMPLE 10

Magnesium powder (50 mesh, 6.1 g, 0.25 mol) was slurried in 85 g of ethanol then 0.24 g of bromine (3.0 mmol) and 1.7 mmol ferric chloride in ethanol were added. After effervescence had become vigorous 55 g of toluene was added and the mixture was placed into a 45° C. oil bath and stirred vigorously. After 3 hours 225 g TEOS was added and the rapidly stirred mixture was slowly heated to a pot temperature of 153° C., where heating was stopped. The vessel was capped and the slurry allowed to cool (maintaining rapid stirring). The mixture was filtered and the solids washed three times with isooctane then dried under moving nitrogen. Yield 28.8 g (100% of theory). Microscopic examination revealed transparent particles in the 10 to 35 micron range with the mode about 17 micron.

Preparation of phthalate ester based catalysts

Magnesium ethoxide (8.2 g, 72 mmol) was slurried in 200 ml of 50/50 (vol/vol) TiCl$_4$/chlorobenzene then isobutyl phthalate (2.5 ml, 8.5 mmol) was added at room temperature. The gently stirred mixture was heated to 110° C. and held for 1 hour. The mixture was filtered hot then another 200 ml of the TiCl$_4$/chlorobenzene mixture was added along with phthaloyl chloride (0.42 ml, 2.9 mmol) and ethyl benzoate (0.37 ml, 2.6 mmol) and the gently stirred slurry held at 110° C. for another 1 hour and filtered hot. The solids were slurried in one final 200 ml portion of the TiCl$_4$/chlorobenzene solvent mix and stirred gently for 0.5 hours at 110° C. The mixture was filtered hot then allowed to cool to 40° C. before washing with six 150 ml aliquots of isopentane. The resulting powder was dried for 100 minutes under moving nitrogen at 40° C. The phthalate ester based catalysts prepared for this study are listed in Table 1.

TABLE 1

| The phthalate ester based catalysts | | |
|---|---|---|
| Catalyst Number | Starting Material Used | Ti content (% wt) |
| 163 | Example 1 - Mg(OEt)$_2$ | 1.80 |
| 189 | Example 2 - Mg(OEt)$_2$ | 2.28 |
| 195 | Example 6 - Mg(OEt)$_2$ | 1.48 |
| 197 | Example 4 - Mg(OEt)$_2$ | 1.86 |

TABLE 1-continued

| The phthalate ester based catalysts | | |
|---|---|---|
| Catalyst Number | Starting Material Used | Ti content (% wt) |
| 199 | Example 5 - Mg(OEt)$_2$ | 2.19 |
| 09 | Example 7 - Mg(OEt)$_2$ | 2.95 |
| 19 | Example 9 - Mg(OEt)$_2$ | 2.28 |
| 27* | Example 9 - Mg(OEt)$_2$ | 2.79 |
| 31* | Example 10 - Mg(OEt)$_2$ | 2.60 |

*these catalysts were prepared without phthaloyl chloride

Preparation of Ethyl Benzoate Based Catalysts

Magnesium ethoxide (5.72 g, 50 mmol) was slurried in 150 ml of 50/50 (vol/vol) TiCl$_4$/chlorobenzene then ethyl benzoate (2.4 ml, 16.7 mmol) was added at room temperature. The gently stirred mixture was heated to 110° C. and held for 1 hour. The mixture was filtered hot then another 150 ml of the TiCl$_4$/chlorobenzene mixture was added along with benzoyl chloride (0.4 ml, 3.4 mmol) and the gently stirred slurry was held at 110° C. for 0.5 hour and filtered hot. The solids were slurried in one final 150 ml portion of the TiCl$_4$/chlorobenzene solvent mix and (stirred gently for 0.5 hour at 110° C. The mixture was filtered hot then allowed to cool at 40° C. before washing with six 150 ml aliquots of isopentane. The resulting powder was dried for 100 minutes under moving nitrogen at 40° C. The ethyl benzoate based catalysts prepared for this study are listed in Table 2.

TABLE 2

| The ethyl benzoate based catalysts | | |
|---|---|---|
| Catalyst Number | Starting Material Used | Ti content (% wt) |
| 191 | Example 2 - Mg(OEt)$_2$ | 2.13 |
| 05* | Example 5 - Mg(OEt)$_2$ | 3.35 |
| 11 | Example 5 - Mg(OEt)$_2$ | 3.33 |
| 13 | Example 7 - Mg(OEt)$_2$ | 3.12 |
| 17 | Example 8 - Mg(OEt)$_2$ | 3.57 |

*The initial digest for this catalyst was only 45 minutes

Autoclave Polymerizations

For LIPP polymerizations using the above described ethyl benzoate catalysts, the autoclave was charged with 2.7 liters of propylene and 132 mmol hydrogen then heated to 60° C. whereupon 0.35 mmol ethyl-p-ethoxy benzoate (pEEB) was injected followed closely by 0.70 mmol of triethylaluminum (TEA) followed by a 5% mineral oil slurry of procatalyst containing 0.01 mmol of Ti. After the initial exotherm the reactor temperature was held at 67° C. for 1 hour. For the phthalate ester based catalysts the separate injection method may also be applied, i.e. to the propylene hydrogen mixture at 65° C. is injected first 0.14 mmol of diphenyldimethoxysilane (DPDMS) followed by 0.56 mmol of TEA followed by procatalyst slurry containing from 0.003 to 0.007 mmol of Ti and polymerization was carried out for a two hour period. It has been found from experience that the selectivity and/or the productivity of these phthalate based catalysts are improved if all of the procatalyst and cocatalyst components are premixed and allowed to stand for about 20 minutes prior to injection into the autoclave. The autoclave chargings, the two hour productivities (both verses total catalyst and verses titanium), the xylene solubles and the bulk densities of the above described phthalate ester based catalysts are reported in Table 3. The equivalent data for the one hour polymerizations using the above described ethyl benzoate based catalysts are reported in Table 4.

catalyst made with the magnesium ethoxide of Example 2 which was not so treated.

TABLE 3

Results of polymerizations using phthalate ester catalysts

| Catalyst Number | Mg(OEt)$_2$ Example Number | TEA/DPDMS/Ti mmol/mmol/umol | (2 hr) Productivity Kg PP/g cat | Xylene Solubles (% wt) | Bulk Density (g/cc) |
|---|---|---|---|---|---|
| 163 | 1 | .56/.14/4.7 n | 23.0 | 4.7 | 0.35 |
| 163 | 1 | .56/.14/4.7 p | 36.0 | 3.7 | 0.435 |
| 163 | 1 | .56/.07/7.0 p | 33.0 | 3.85 | — |
| 189 | 2 | .56/.14/4.8 n | 28.5 | 5.3 | 0.35 |
| 189 | 2 | .56/.14/4.8 p | 27.5 | 4.3 | 0.37 |
| 195 | 6 | .56/.14/3.1 n | 24.5 | 5.8 | 0.385 |
| 197 | 4 | .56/.14/3.9 p | 50.0 | 3.9 | 0.395 |
| 199 | 5 | .56/.14/4.6 p | 61.3 | 3.6 | 0.35 |
| 199 | 5 | .56/.039/4.6 p | 63.5 | 4.6 | 0.345 |
| 09 | 7 | .56/.14/6.2 p | 56.2 | 3.0 | 0.36 |
| 19 | 9 | .56/.14/4.8 p | 54.0 | 2.7 | 0.34 |
| 27 | 9 | .56/.14/5.8 p | 50.0 | 3.3 | 0.31 |
| 31 | 11 | .42/.06/7 n | 55.5 | 4.5 | 0.392 |
| 31 | 11 | .30/.044/5 p | 63.2 | 3.5 | 0.32 | p means all catalyst components premixed 20 minutes before injection
n means catalyst components injected sequentially without premix

TABLE 4

Results of polymerizations using ethyl benzoate catalysts

| Catalyst Number | Mg(OEt)$_2$ Example Number | TEA/DPDMS/Ti mmol/mmol/umol | (2 hr) Productivity Kg PP/g cat | Xylene Solubles (% wt) | Bulk Density (g/cc) |
|---|---|---|---|---|---|
| 191 | 2 | .70/.35/6.4 | 15.1 | 4.3 | 0.295 |
| 191 | 2 | .70/.35/10 | 14.5 | 4.7 | — |
| 05 | 5 | .70/.35/10 | 21.3 | 2.8 | 0.305 |
| 05 | 5 | .70/.17/10 | 31.5 | 3.8 | 0.305 |
| 11 | 5 | .70/.35/10 | 24.4 | 3.6 | 0.32 |
| 11 | 5 | .70/.17/10 | 34.2 | 4.0 | 0.295 |
| 13 | 7 | .70/.35/10 | 26.6 | 4.1 | 0.31 |
| 13 | 7 | .70/.17/10 | 32.2 | 5.0 | 0.335 |
| 17 | 8 | .70/.35/10 | 23.2 | 3.3 | 0.29 |
| 17 | 8 | .70/.17/10 | 30.5 | 3.9 | — |

TABLE 5

Comparison of calculated catalyst particle size to observed particle size for the various magnesium ethoxides

| Magnesium Ethoxide | Polymer Average Particle Size (micron) | Calculated Average Catalyst Particle Size (micron) | Observed for Starting Material (micron) |
|---|---|---|---|
| Example 1 | 1344 | 41 | ~200 |
| Example 2 | 642 | 21 | >12 |
| Example 4 | 841 | 23 | ~25 |
| Example 5 | 583 | 15 | ~15 |
| Example 6 | 506 | 17 | ~15 |
| Example 7 | 628 | 16 | ~15 |
| Example 9 | 494 | 13 | ~14 |

Looking at Table 3, it can be seen that the catalysts which were made with magnesium ethoxides which were treated by boiling them in tetraethoxysilane showed greatly superior productivity when compared to the catalysts which were made with magnesium ethoxides which were not so treated (Examples 1, 2 and 6) even though the catalyst of Example 1 was contacted with TEOS (at room temperature) and the catalysts of Examples 1 and 6 were treated at elevated temperature (without TEOS). In fact, the productivity in kilograms of polypropylene per gram of catalyst is almost doubled when the boiling procedure is used. Similar results can be seen by looking at Table 4 which reports the results of the ethylbenzoate catalyst polymerizations. In this case, the magnesium ethoxides from Examples 5, 7 and 8 (which were treated by boiling in TEOS) show greatly increased productivity when compared to the The morphology of the polymers made with these catalysts is compared in Table 5. Examples 1, 4, 5, 6, 7 and 9 were all carried out by making the magnesium ethoxide by starting with magnesium metal. Example 2 was carried out by taking an already manufactured magnesium ethoxide. Only Examples 4, 5, 6, 7 and 9 were treated by boiling in TEOS. In order to achieve good morphology, it is important that the catalyst not break up during polymerization. Generally, one catalyst particle should yield one polymer particle. If the calculated average catalyst particle size (calculated by dividing the average polymer particle size by the cube root of the productivity) is the same as or very similar to the particle size observed (estimated by microscopic observation) for the starting material, then the catalyst has not broken up and the catalyst and polymer morphology is considered to be good. It can be seen that for the TEOS boiled magnesium ethoxides, this is the case. However, it is not the case for Examples 1 and 2. The difference is much more dramatic when one looks at Example 1 since Example 2 was not carried out in the same manner as the other examples.

I claim as my invention:

1. A process for improving the productivity and morphology of a polymerization catalyst formed from a magnesium ethoxide, which comprises treating said magnesium ethoxide with a silane of the formula $R_m'Si(OR)_{4-m}$ where $R=C_nH_{2n+1}$, $n \geq 2$, $0 \leq m < 4$ and R' may be an aryl or alkyl, at or above the temperature at which any alcohol which may be bound to the magnesium ethoxide would dissociate from the ethoxide prior to subjecting said magnesium ethoxide to metathesis.

2. The process of claim 1 wherein the silane is selected from the group consisting of silicon tetraethoxide, silicon tetraisopropoxide, silicon tetrabutoxide and silicon tetrapropoxide.

3. The process of claim 1 wherein the temperature is at least about 105° C.

4. The process of claim 1 wherein the silane is diluted with an unreactive solvent.

5. The process of claim 4 wherein the solvent is selected from the group consisting of kerosene, cyclohexane, chlorobenzene, isooctane, decahydronaphthalene, tetrahydronapthalene, xylene, toluene and high boiling kerosene fractions.

6. The process of claim 1 wherein the silane is silicon tetraethoxide.

* * * * *